Dec. 29, 1942.  W. D. SWALLOW  2,306,649
METHOD OF SEPARATING METALS FROM SOLUTIONS
Filed June 13, 1941   2 Sheets-Sheet 1

INVENTOR,
William Duncan Swallow.
BY
ATTORNEY.

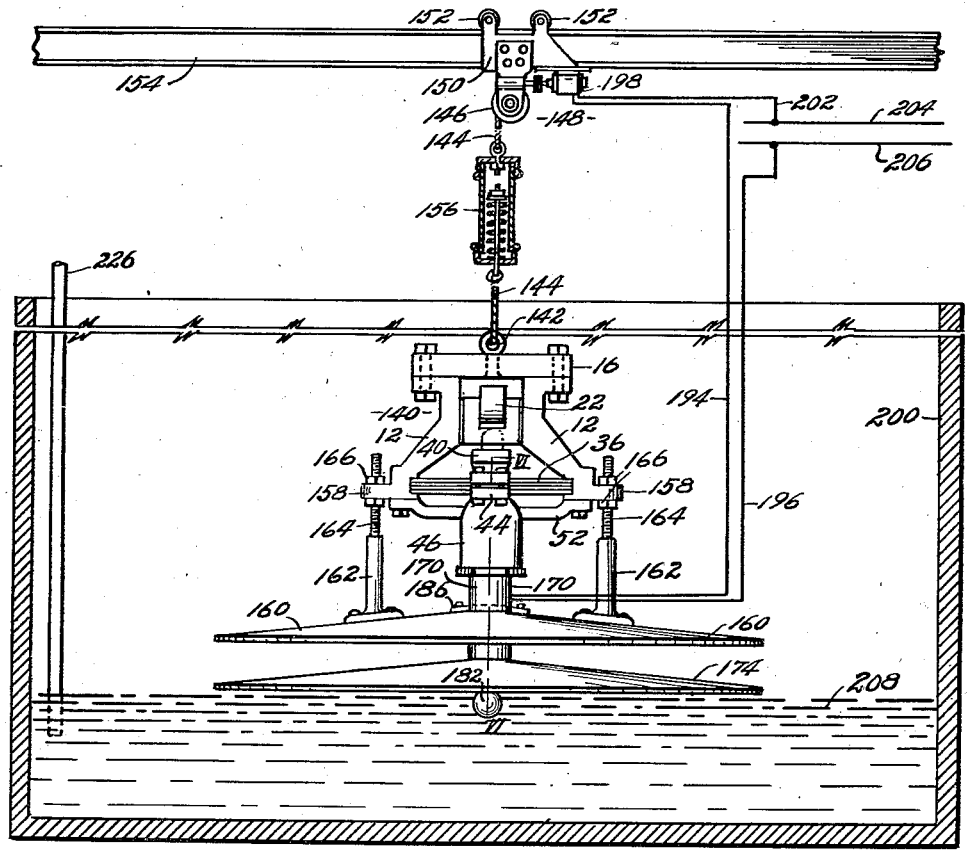
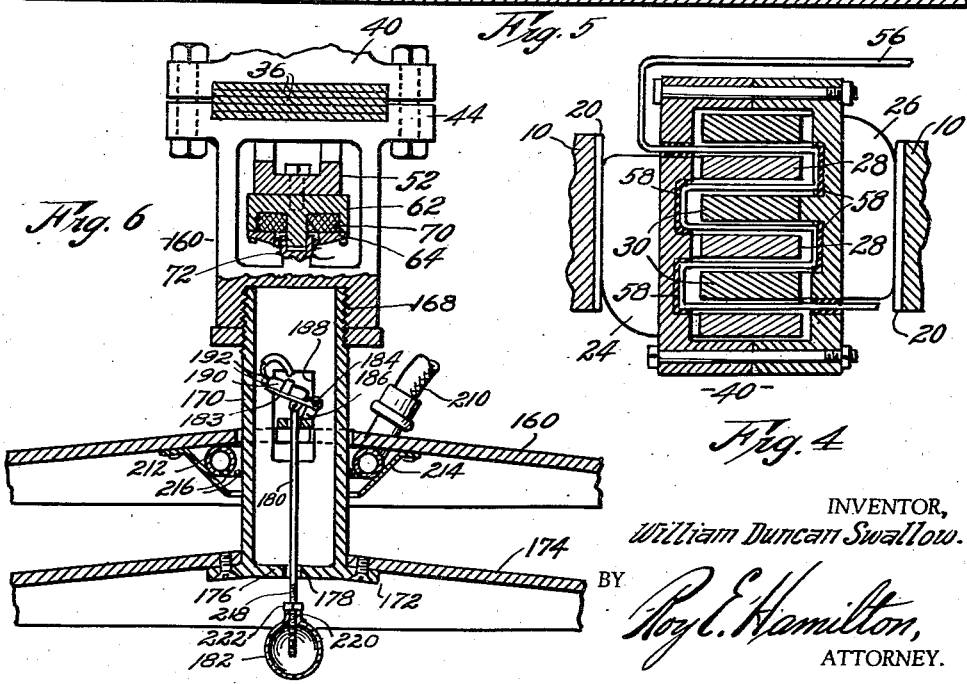

Patented Dec. 29, 1942

2,306,649

UNITED STATES PATENT OFFICE 2,306,649

METHOD OF SEPARATING METALS FROM SOLUTIONS

William Duncan Swallow, Kansas City, Mo., assignor of twenty-six and two-thirds per cent to George S. Pelton and Herbert E. Pelton, both of Los Angeles, Calif.

Application June 13, 1941, Serial No. 397,890

9 Claims. (Cl. 75—108)

This invention relates to improvements in the method of separating metals from solutions and refers particularly to the continuous separation of metals from their minerals, mineral residues, wastes, slimes, tailings, escorias, mineral muds, etc. wherein a vibratory action of the solution is produced.

In many cases the solution containing the metal compound together with foreign matter which is held in unstable suspension the metal values are deposited on copper or zinc which acts as a precipitant. Under the ordinary conditions the chemical action takes place very slowly and the foreign matter gradually collects on the precipitant and insulates it from the solution to further slow down the precipitation of the metal. Thus in some instances this method of recovery has proven very expensive and unprofitable. The long period of time necessary to clarify the solution by settling by the present methods is too expensive for commercial use.

A further object of this invention is the use of vibratory means to speed up chemical and physical reactions in metallurgical processes by rapid agitation and the prevention of settling the foreign matter.

Another object of the invention is the obtaining of a clear solution by the use of vibration means to cause flocculation and set up rapid settling of the suspended foreign matter.

With these as well as other objects which will appear during the course of the specification, in view, reference will now be had to the drawings wherein:

Fig. 4 is an enlarged, fragmentary sectional view taken on line IV—IV of Fig. 1.

Fig. 5 is an elevational view of the flocculating apparatus shown partly in section.

Fig. 6 is an enlarged, fragmentary sectional view taken on line VI—VI of Fig. 5.

Figures 1, 2, 3:
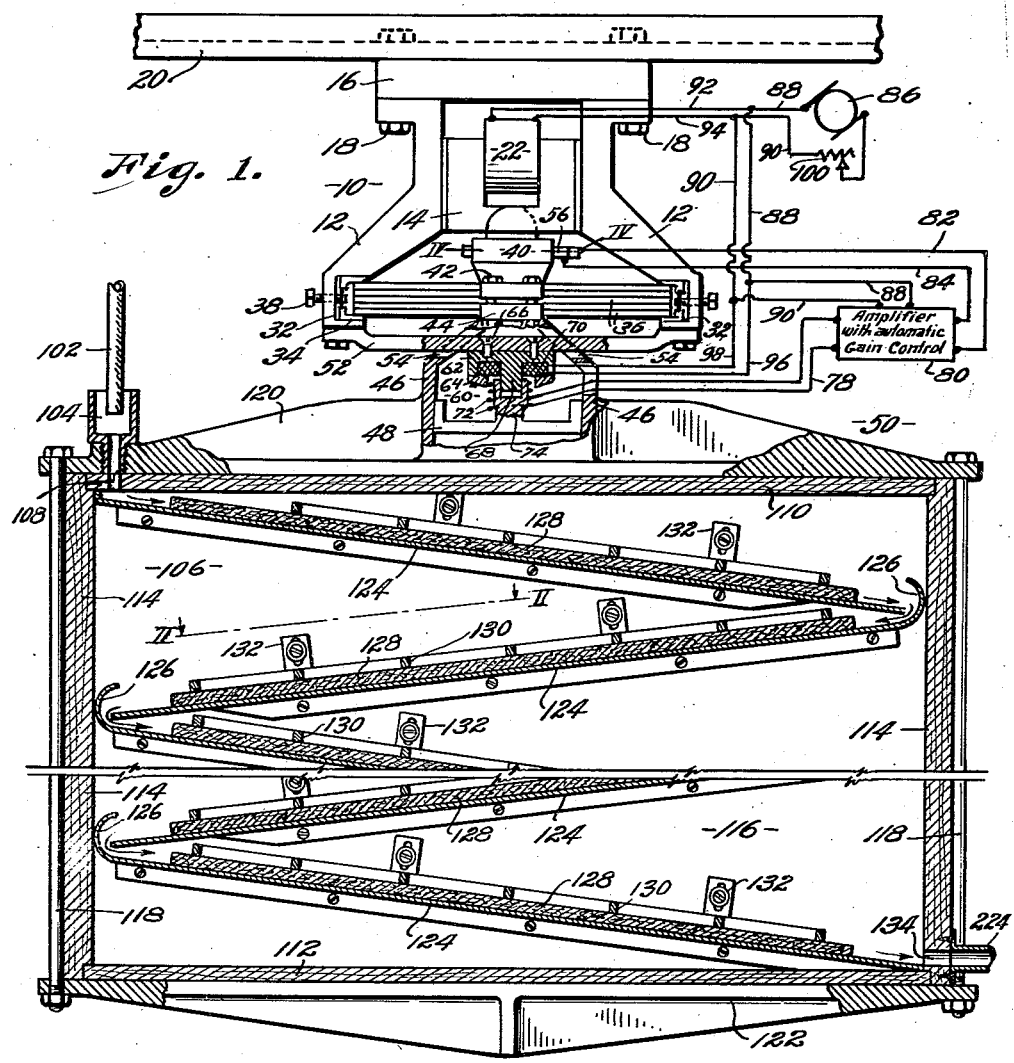
Figure 1 is a diagrammatic sectional view of an apparatus for separating metals from a solution embodying this invention.
Fig. 2 is a fragmentary sectional view taken on line II—II of Fig. 1.
Fig. 3 is a fragmentary sectional view taken on line III—III of Fig. 2.

Through the several views like reference characters refer to similar parts and the numeral 10 designates an electric reciprocating motor, which is clearly set forth in my co-pending application for Electric reciprocating motor, which is Serial Number 378,512. This motor is so constructed and driven that it will maintain a substantially constant amplitude of vibration with varying loads. Another characteristic of the motor is that it is so related to the load to be vibrated that the frequency of the current to the motor is maintained in step with the frequency of vibration of the load or mass being vibrated.

The motor frame pieces 12 are spaced apart to receive the field magnet 14 therebetween and are securely attached to plate 16 by means of bolts 18. Bolts 18 also extend through the supporting overhead beams 20 which is rigidly supported in any suitable manner not shown.

The conventional coil 22 is wound about the body portion of field magnet 14. The pole pieces 24 and 26 are provided with fingers or digits 28 and 30 respectively, which are in regular spaced apart or inter-digitated relation, as clearly shown in Fig. 4.

Frame members 12 are slotted at 32 to receive the respective end portions of the laminated spring 36. Screws 38 are adapted to be operated to move blocks 34 to any desired position to regulate the effective vibrating section of spring member 36.

Spring member 36 carries at its center portion a non-ferrous armature frame 40, which is secured by bolts 42 to the non-ferrous member 44 having downwardly extending arms 46 joined together by brace 48 and supporting a vibratory separating device 50 therebelow. A bar 52 secured at its opposite ends to members 12 extends through openings 54 formed through arms 52. An armature winding 56 carried by frame 40 and insulated therefrom by means of insulators 58, is adapted to reciprocate between the inter-digitated pole pieces 24 and 26.

Referring to Fig. 4, it will be noted that this armature winding 56 is in zig-zag form and is of sufficient size to hold its form so that it can be closely spaced between the pole digits where the magnetic field is strongest thereby producing a very efficient structure. While only a single winding of the armature coil is shown, however it is apparent that a plurality of windings might be employed without changing the general operation of the device.

This heavy current carrying conductor 56 positioned as shown makes it possible to maintain proper spacing of the conductor and pole pieces without separating the inter-digitated members beyond practical limits, and at the same time presents a sufficiently rigid structure to maintain the parts in proper operative relation.

Reference will now be had to the A. C. current generator 60 which is best shown in Fig. 1. The field member 62, having a pole piece 64, is securely mounted on cross-bar 52 by means of screws 66 and has a central pole piece 68 which extends between the spaced apart pole pieces 64 and 68 and carries a field coil 70 which serves to strengthen the magnetism between the portion in which the coil 72 is conducted by wires 76 and 78 to the amplifier 80 having automatic gain control. The output of amplifier 80 is conducted by wires 82 and 84 to the armature winding or driving coil 56. When thus connected the frequency of alternation of the amplifier power current will be in step with the frequency of vibration of the vibratory separating device 50 and as stated above screws 40 may be adjusted to vary the effective length of spring members 36 to vary the frequency of vibration of device 50.

Since the frequency of the current from the generator 62 controls the frequency of the current fed to the driving coil 56 regardless of any change in the vibration of device 50 due to change of load or for any other reason the driving current is always in phase with the vibration of device 50.

Current from the D. C. source 86 is fed through wires 88 and 90 to amplifier 80 where it is properly controlled for use in driving coil 56. Wires 92 and 94 connected respectively with wires 88 and 90 furnish D. C. current to magnet field coil 22. Also wires 96 and 98 join respectively to wires 88 and 90 and supply current to field coil 70. A variable resistance 100 is positioned in line wire 90 adjacent the D. C. source 86.

The apparatus 50 to be vibrated receives a stream of the solution, from which the values are to be separated, through conduit 102 which is in communication with hopper 104 carried by the housing forming the container 106 of the apparatus which in turn communicates with the interior of the container through opening 108. The housing 106 comprises top plate 110, bottom plate 112, and walls 114, side walls 116 secured together by bolts 118 engaging top and bottom reinforcing members 120 and 122 as clearly shown in Fig. 1. Member 120 as shown is integral with armature frame 40 but may be made separate and then secured thereto.

Inclined plates 124 extend in spaced apart zigzag relation from a point just below the feed opening 108 to the bottom of the container 106, and are securely supported on side walls 116. Solutions delivered through conduit 102 will move over the plates 124 in a zig-zag path from the top to the bottom of said container. The upper edge portion of all except the bottom plate 124 is flanged upwardly at 126 to insure proper direction to the liquid flow.

A precipitant 128 of sponge or foraminous material such as copper or zinc is positioned in sheet form on the various plates 124 and is secured in operative relation thereon by means of open racks 130 which are secured in position by adjustable fastening means 132. The treated solution leaves the container 106 through the opening 134 disposed in the end wall just above the top surface of the lower portion of the bottom plate 124.

The angle of inclination, length and number of collecting plates 124 may be varied to suit the particular type of solution being treated; furthermore, the plates 124 themselves may be made of a reagent material.

Referring now to the form of separation of flocculator shown in Figures 5 and 6, it will be noted that the electric reciprocating motor 140 is substantially the same as the motor 10 but is provided with an eyelet 142 to which is attached cable 144 by means of which it is vertically connected with drum 146 of hoist 148. The hoist frame 150 is provided with rollers 152 by means of which it is supported for longitudinal adjustment along the one head track 154. Interposed in cable 144 is a resilient member 156 which isolates the motor vibrations from the hoist.

The motor frame pieces 12 are provided with outwardly projecting ears 158 to which is adjustably supported reflector member 160 by means of rods 162, threaded at 164 and provided with adjust nuts 166. The lower end portion of member 44 is recessed and threaded at 168 to receive the threaded end of tubular member 170 which is flanged at 172 to support the vibratory plate 174. An inturned flange 176 at the lower end of member 170 forms an opening 178 through which extends the stem 180 of a float 182.

The upper end of stem 180 is pivoted to a mercury switch support 183 which in turn is pivoted at 184 to a bracket 186 which extends through openings 188 formed through member 170 and is secured to the reflector member 160. The mercury switch tube 190 having contact points 192 which are connected by wires 194 and 196 to control the electric motor 198 carried by frame 150 which serves to raise and lower the vibrating apparatus in the tank 200. Line wire 194 connects one pole of the motor 198 to one contact point of the mercury switch while the other pole of motor 198 is connected by wire 202 to one of the power supply line wires 204 and the other line wire 206 is connected by wire 196 to the other contact point of the mercury switch.

When the switch member 190 is lowered relative to the vibrator member 174 then the mercury switch will close thus starting motor 198 and causing the vibrating apparatus to be lowered to the proper distance from the level of the solution 208 contained within the tank. The solutions to be treated are fed from the desired source through conduit 210 to the annular feed ring 212 which is supported in position about tubular member 170 by means of a frusto-conical bracket 214 secured to the under side of reflector member 160. Feed ring 212 is perforated at 216 so as to deliver the solution to all points about member 170. The solution thus delivered will be directed to the top surface of vibratory member 174 where it will be vibrated at the proper frequency.

The lower end portion of stem 180 is threaded at 218 to engage threads formed in the neck 220 of the float 182. A lock nut 222 is provided on member 180 to secure the float against accidental turning.

It is quite apparent that the container 106 might be made air tight and means provided to create a partial vacuum therein so as to carry on the precipitation in the absence of objectional quantities of oxygen.

The general method of separating the metal from a solution containing salts thereof is as follows:

The solution is delivered through conduit 102 to the receptacle 106 where it passes through the foraminous precipitant 128 as the precipitant is being rapidly vibrated by means of the electrical reciprocating motor 10.

The receptacle 106 is of sufficient depth to permit a substantially complete recovery of the metal so that a barren solution will pass through opening 134 to pipe 224 which connects with conduit 210 whereby said barren solution is delivered to the vibratory member 74 which operates in conjunction with the reflector member 160 to cause flocculation of the objectionable foreign particles contained in the solution whereby they are caused to settle in tank 200.

This clarified solution is now in condition to be drawn through tube 226 and again used in the recovery operation. It is apparent that this solution will need to be strengthened from time to time in order to maintain a solvent suitable for dissolving the metal salts.

In the treating of certain tailings, slimes, mineral muds, etc., it might be found desirable to flocculate the mineral bearing solution prior to precipitation. This could be accomplished by means of the apparatus shown and described.

It is apparent that this general method of separating metals from solutions containing salts thereof is applicable for use in separating a metal from a hypo sulphite cupric solution containing the salts of said metal as well as various other metal containing solutions.

Having thus described the invention what I claim as new and desire to secure by Letters Patent is:

1. The method of separating a metal from a solution containing a metal, comprising vibrating said solution in the presence of a vibrating precipitant whereby the metal is precipitated, removing the precipitate from said solution then clarifying the barren solution by vibratory movement, settling, and separation for reuse.

2. The method of separating a metal from a solution containing a salt of said metal comprising passing said solution over a vibrating element containing a precipitant to produce a high degree of vibration between said solution and said precipitant, whereby the reagent is maintained free from foreign coating as the metal is deposited thereon.

3. The method of separating a metal from a hypo sulphite cupric solution containing salts of said metal comprising vibrating said solution at audible frequency in the presence of a copper precipitant, whereby the metal is collected on said copper withdrawing said reagent and collected metal from said solution, and clarifying said hypo sulphite cupric solution by audio frequency vibratory movement for reuse.

4. The method of precipitating a metal from a solution having non-metallic material suspended therein and containing a salt of said metal comprising vibrating a precipitant in said solution at audio frequency, whereby the metal is deposited on said precipitant, then withdrawing said coated precipitant from said solution.

5. The method of separating a metal from a solution containing a salt of said metal comprising vibrating said solution in the presence of a precipitant to collect the metal thereon, removing the precipitant and precipitate from said solution, passing said barren solution through a rapidly vibrating flocculating device to cause a clarification thereof, then returning said clarified solution to the separation process for reuse.

6. The method of separating a metal from a solution containing a salt of said metal, comprising moving a stream of said solution over an element vibrating at audio frequency and containing a precipitant whereby an audio frequency of vibration is set up between said solution and said precipitant whereby said metal is precipitated on said precipitant, and then separating said precipitated metal from said solution.

7. The method of precipitating a metal from a solution containing a compound of said metal comprising vibrating said solution by means of an electric audio frequency vibrator in the presence of a precipitant whereby said metal is precipitated, removing said precipitant and precipitate from said solution and then clarifying the barren solution for reuse.

8. The method of precipitating a metal from a solution containing a compound of said metal comprising vibrating said solution by means of an electric vibrator at the frequency of the power current which is determined by the frequency of vibration of said vibrated mass in the presence of a precipitant whereby said precipitant is maintained clear of non-metallic foreign deposits contained in the solution to permit rapid precipitation of the metal thereon.

9. The method of separating a metal from a hypo sulphite cupric solution containing salts of said metal comprising vibrating said solution at relatively high frequency in the presence of a copper precipitant whereby the precipitant is maintained free from non-metallic coatings to permit free precipitation of the metal thereon.

WILLIAM DUNCAN SWALLOW.